United States Patent [19]

Korsky

[11] Patent Number: 4,773,068
[45] Date of Patent: Sep. 20, 1988

[54] DUAL CHANNEL TRANSMISSION METHOD AND APPARATUS WITH INHERENT CHANNEL IDENTIFICATION AND EXTRACTION

[75] Inventor: Vincent V. Korsky, Shelton, Conn.

[73] Assignee: TIE/communications, Inc., Shelton, Conn.

[21] Appl. No.: 596,305

[22] Filed: Apr. 3, 1984

[51] Int. Cl.$^4$ .............................................. H04J 15/00
[52] U.S. Cl. .................................................. 370/119
[58] Field of Search ...................... 370/18, 19, 78, 119, 370/9

[56] References Cited

U.S. PATENT DOCUMENTS

| | | | |
|---|---|---|---|
| 2,607,035 | 8/1952 | Levine | 370/9 |
| 3,013,147 | 12/1961 | Guerth | 370/78 |
| 3,758,719 | 9/1973 | Klose | 370/78 |
| 3,949,171 | 4/1976 | Painter | 370/119 |
| 4,417,320 | 11/1983 | Ei | 307/475 |
| 4,618,952 | 10/1986 | Bochor et al. | 370/78 |

FOREIGN PATENT DOCUMENTS 163086 2/1980 Netherlands .......................... 370/78

OTHER PUBLICATIONS

"1985 Black Box Catalog", Black Box Inc., p. 111.
Fibronics Coaxial Doubler Specifications, Fibronics Inc., Hyannis, MA.

Primary Examiner—Douglas W. Olms
Assistant Examiner—Wellington Chin
Attorney, Agent, or Firm—Francis N. Carten

[57] ABSTRACT

The present invention is embodied in and carried out by a dual channel transmission system with inherent channel identification and extraction. This system employs a data transmission method which has the inherent characteristic that, when two identical receivers are connected to a single signal driver which is transmitting a data stream containing data for each of the channels including one of these receivers, each identical receiver extracts only the data intended for its channel. This method affords the advantage that the signal driver bandwidth may be reassigned by software control so that, when needed, one receiver may extract both channels.

6 Claims, 2 Drawing Sheets

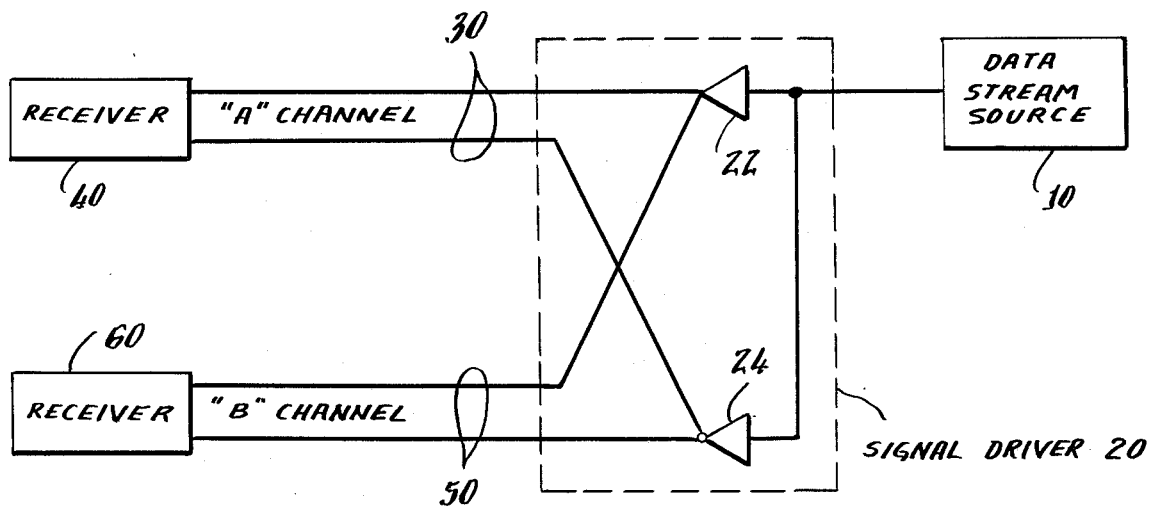
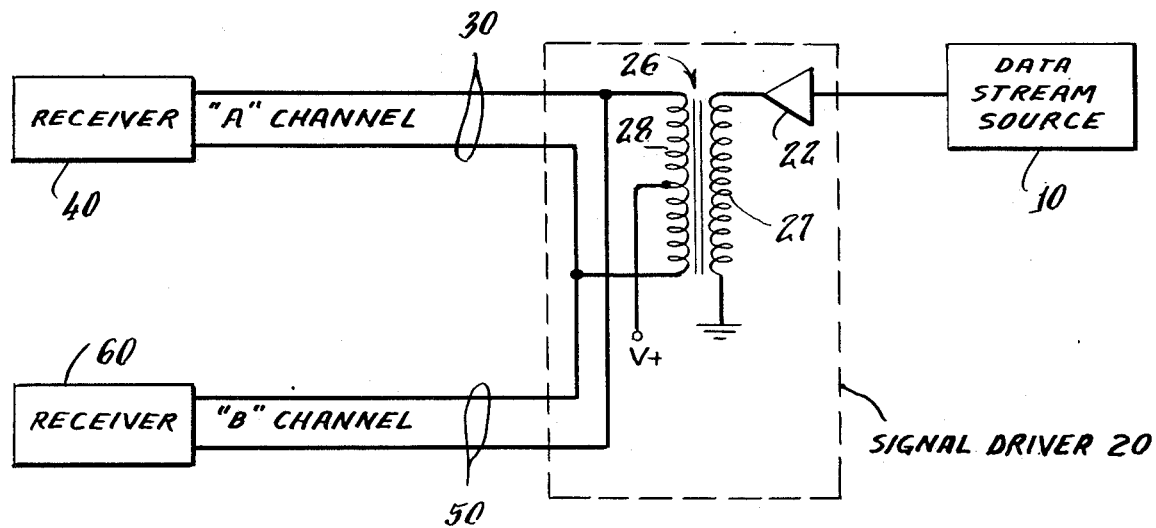

DUAL CHANNEL TRANSMISSION METHOD AND APPARATUS WITH INHERENT CHANNEL IDENTIFICATION AND EXTRACTION

BACKGROUND OF THE INVENTION

Known methods of data transmission utilize either a dedicated port system or a time-multiplexed system. In a dedicated port system, the data transmitted by a dedicated signal driver is always received by a dedicated signal receiver. In a time-multiplexed system, a single signal driver may transmit data to several signal receivers. In such a system, it is necessary to provide external identification for each receiver in order to insure that each receiver extracts from the data system only the data intended for it. The external identification in such a system is commonly provided by hardware switch settings, or by external decoding circuitry which enables data reception during the correct time segment.

SUMMARY OF THE INVENTION

The present invention is embodied in and carried out by a dual channel transmission system with inherent channel identification and extraction. This system employs a data transmission method which has the inherent characteristic that, when two identical receivers are connected to a single signal driver which is transmitting a data stream containing data for each of the channels including one of these receivers, each identical receiver extracts only the data intended for its channel. This method affords the advantage of reducing by half the number of signal drivers needed to generate data for any number of channels, thereby effecting significant savings in equipment cost, space, and power consumption. A further advantage is that the signal driver bandwidth may be reassigned by software controls so that, when needed, one receiver may extract both data channels, i.e., use both channels simultaneously.

When this technique is applied to telephone systems, the automatic channel selection feature eliminates the possibility of human error in the installation process, since each telephone station set is identical and does not include any channel selector switch.

BRIEF DESCRIPTION OF THE DRAWINGS

The present invention will be best understood if the written description thereof is read with reference to the accompanying drawings, of which:

FIG. 1 is a schematic circuit diagram of a first circuit in which the transmitted data stream is provided to a first receiver with one polarity and to a second receiver with the opposite polarity;

FIG. 2 is a schematic circuit diagram of a second circuit in which the transmitted data stream is provided to a first receiver with one polarity and to a second receiver with the opposite polarity;

DETAILED DESCRIPTION OF THE PREFERRED EMBODIMENTS

Figure 3:
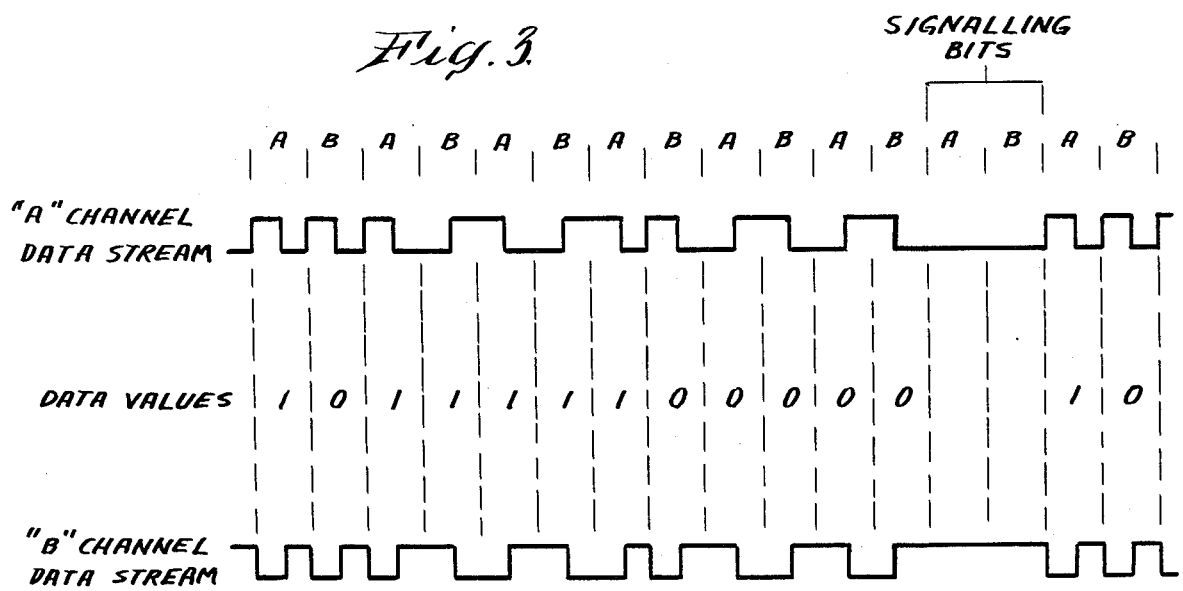
FIG. 3 shows a first bi-phase modulated data stream received by one data channel receiver, and a second, inverted bi-phase modulated data stream received by another data channel receiver.
Figure 4:
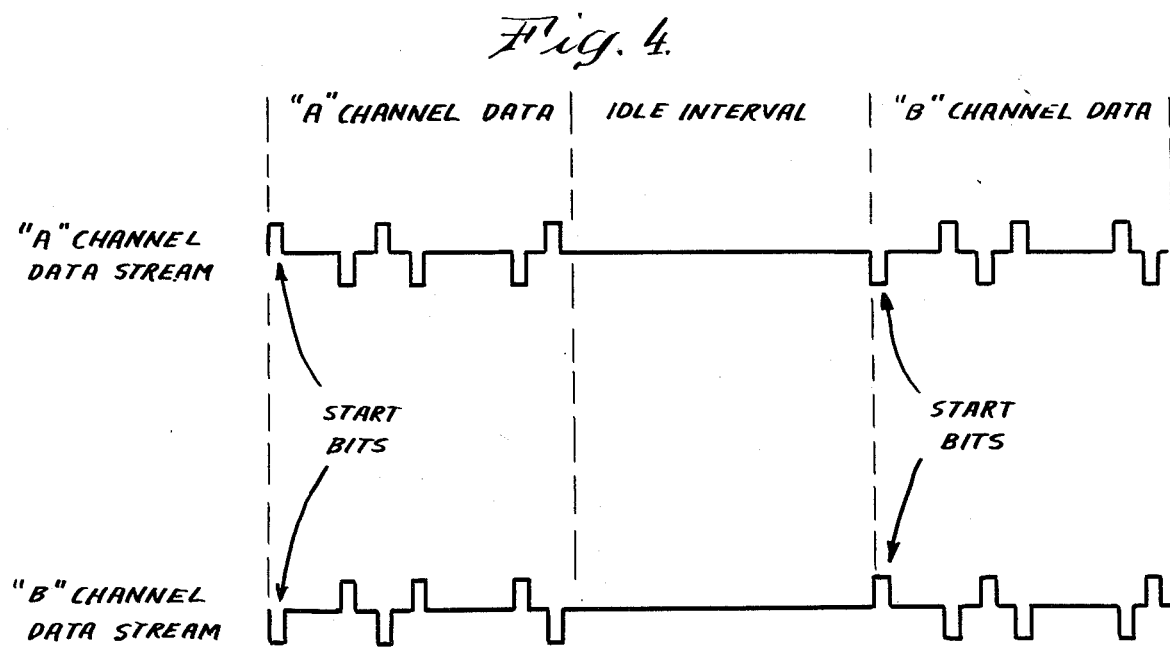

Referring specifically to FIGS. 1 and 2, in which like components are designated by like reference numbers, the data stream source 10 output is fed to signal driver 20, which transmits the data stream via conductor pair 30 (the "A" channel) to receiver 40 without altering polarity, and transmits the data stream via conductor pair 50 (the "B" channel) to receiver 60 with polarity inverted. The data stream source 10 and the signal driver 20 may be elements of the common equipment unit (CEU) in a key telephone system or a private automatic branch exchange (PABX), and the receivers 40 and 60 may be elements of a single telephone station set having two communication channels, or of two separate telephone station sets each having a single communication channel. In FIG. 1, the signal driver 20 comprises a non-inverting amplifier 22 and an inverting amplifier 24, each of which receives the data stream and transmits it to terminals of opposite polarity in receivers 40 and 60. In FIG. 2, an alternative embodiment of signal driver 20 comprises a non-inverting amplifier 22, the output of which is fed to primary winding 27 of transformer 26. The data stream output appearing across the secondary winding 28 is transmitted, uninverted, to receiver 40, and is transmitted, inverted, to receiver 60.

DC voltage V+ is also supplied to the receivers 40 and 60 (and to the other circuitry in the telephone station set(s) of which they might be a part) through a center tap in secondary winding 28 via a "phantom pair", as disclosed and claimed in U.S. Pat. No. 4,173,714, the disclosure of which is hereby incorporated by reference. Each receiver 40 and 60 includes a phase lock circuit to extract the fundamental clock frequency (e.g., 128 k Hz) from the data stream, and thereby synchronize the receivers to the incoming data. Once the receivers 40 and 60 have their clocks phase-aligned to the incoming data stream, synchronization of the signalling receiver data is necessary. This synchronization is achieved by transmitting a unique data pattern during the signalling time slots, as will be described.

To provide the system characteristic of inherent channel identification and extraction, it is necessary to choose the correct data modulation methods and to transmit unique data patterns so that each receiver 40 and 60 will have sufficient information to extract the data intended for the channel asssociated with the receiver, i.e., the "A" channel data for receiver 40, and the "B" channel data for receiver 60. Since the receivers 40 and 60 are identical, it is necessary to embed the unique channel identification into the data signalling stream, and to provide another variable to each receiver to enable extraction and interpretation of the embedded channel identifiers in the data stream. This additional variable is obtained by sending an inverted data stream to one of the receivers. This is accomplished by the circuitry of FIGS. 1 and 2 described hereinabove.

Referring now specifically to FIG. 3, the waveforms shown represent one implementation for a full duplex transmission scheme. Data is transmitted with bi-phase modulation, i.e., a "0" bit corresponds to a negative transition of one cycle during the bit period, and a "1" bit corresponds to a positive transition of one cycle during the bit period. Channel "A" data and channel "B" data are bit interleaved. Control signalling data is further interleaved by transmitting one control bit for a predetermined number of data bits. In a preferred embodiment the signalling rate is 63 k bits of data and 1 k bits of signalling per channel. Thus, one channel comprises 64k bits of bandwidth and two interleaved channels comprises 128 k bits of bandwidth. With this bi-phase modulation scheme, normal data will always produce a data transition during a bit period. To provide a unique signalling frame marker during the time when two signalling bits are transmitted, the bi-phase modulation scheme is violated by omitting transitions, i.e., the bit stream is neither going positive nor going negative. As shown in FIG. 3, the absence of two consecutive mid-bit transitions constitutes the signalling frame marker. The "A" channel receiver 40 recognizes the two consecutive "0" signal bits, and the "B" channel receiver 60 recognizes the two consecutive "1" signal bits; each signal bit pair indicates the start of a signalling frame. The polarity difference between the signal bit pairs transmitted to the "A" and "B" channel receivers provides those identical receivers with the distinctive data patterns, or identifiers, to enable them to extract only their respective channel's data bits from the bit stream.

The advantages of the present invention, as well as certain changes and modifications to the diclosed embodiments thereof, will be readily apparent to those skilled in the art. It is the applicant's intention to cover all those changes and modifications which could be made to the embodiments of the invention herein chosen for the purposes of the disclosure without departing from the spirit and scope of the invention.

What is claimed is

1. A method of transmitting digital data for two data channels, comprising essentially the steps of:
   (a) a generating a single digital data stream comprising data and signalling bits for a first data channel interleaved with data and signalling bits for a second data channel,
   (b) transmitting said digital data stream, uninverted in polarity, through the first data channel, and simultaneously transmitting said digital data stream, inverted in polarity, through the second data channel,
   (c) extracting in the first data channel the digital data for that channel in response to said signalling bits for the first data channel having a first polarity, and simultaneously extracting in the second data channel the digital data for that channel in response to said signalling bits for the second data channel having a second polarity.

2. The method according to claim 1, wherein said step of generating a single digital data stream comprises bi-phase modulation.

3. The method according to claim 2, wherein said signalling bits comprise two consecutive bit periods in which transitions are omitted.

4. A system for transmitting digital data for two data channel, comprising:
   (a) source means for generating a single digital data stream containing data and signalling bits for a first data channel interleaved with data and signalling bits for a second data channel;
   (b) signal driver means for transmitting said digital data stream, uninverted in polarity, through the first data channel, and for transmitting said digital data stream, inverted in polarity, through the second data channel;
   (c) first receiver means in said first data channel for extracting the digital data for said first data channel in response to signalling bits for said first data channel having a first polarity; and
   (d) second receiver means in said second data channel for extracting the digital data for said second data channel in response to signalling bits for said second data channel having a second polarity.

5. The system according to claim 4, wherein said source means generates a bi-phase modulated digital data stream.

6. The system according to claim 5, wherein said signalling bits to which said first and second receivers respond comprise two consecutive bit periods in which transitions are omitted.

* * * * *